[72] Inventor David P. Borenstein
Red Bank, N.J.
[21] Appl. No. 730,193
[22] Filed May 17, 1968
[45] Patented Dec. 29, 1970
[73] Assignee Bell Telephone Laboratories, Incorporated
Murray Hill, Berkeley Heights, N.J.
a corporation of New York

[54] ERROR COMPENSATION NETWORK FOR VIDEO SIGNALS

4 Claims, 3 Drawing Figs.

[52] U.S. Cl. ... 178/7.3
[51] Int. Cl. ... H04n 5/16
[50] Field of Search ... 178/7.3DC, 7.5DC

[56] References Cited
UNITED STATES PATENTS
3,324,405 6/1967 Corney ... 178/7.3(DC)

*Primary Examiner*—Richard Murray
*Attorneys*—R. J. Guenther and William L. Keefauver

ABSTRACT: Compensation for low frequency distortion and other errors in a composite video signal is achieved by selectively draining charge from a capacitor in a direct current restoring circuit. The magnitude of the charge drained from the capacitor is controlled to vary in an inverse relationship to the restored video signal magnitude. Thus, a continuous correction in a potential developed across the capacitor compensates for distortion on the restored video signal.

INVENTOR
D. P. BORENSTEIN
BY
C. E. Hirsch Jr.
ATTORNEY

ERROR COMPENSATION NETWORK FOR VIDEO SIGNALS

BACKGROUND OF THE INVENTION

This invention relates to apparatus for controlling signal levels and, more specifically, to apparatus for clamping a broadband video waveform to a reference potential level.

Conventional video clamping circuits may be grouped into two classifications, namely, synchronous and asynchronous.

One type of synchronous clamping circuit typically utilizes a pulse activated switch, for example a diode, to sample the video signal level during a predetermined time interval. In accordance with the sampled signal, a DC reference level is adjusted to and maintained at a predetermined level. No provision, however, is provided in such a circuit to compensate for other errors in the signal; for example, tilt resulting from low frequency distortion. A second type of synchronous circuit uses sampling techniques in which the envelope of the video waveform is detected. The detected signal is usually adjusted in frequency and magnitude and then subtracted from the original signal, thereby compensating for errors. In such a system, a residual error is created because of the sampling techniques utilized. Correction of this residual error entails use of complex apparatus. Thus, synchronous clamping circuits are undesirable in many applications because of their complexity and required use of ancillary apparatus for synchronously sampling the video signal.

Asynchronous clamping circuits are generally of the DC restorer type. They usually comprise a diode associated with a coupling capacitor. The diode is arranged to conduct during the synchronizing pulse portion of the video waveform. A DC voltage reference level is set by the charge developed on the coupling capacitor. In an attempt to eliminate wandering of the DC level, a shunt resistor or a constant current network may be utilized to drain charge from the capacitor. In these instances, however, no provision is provided for adjusting the drain signal to compensate for low frequency distortion or for distortion created by the clamping action of the circuit. Indeed, the resistor or constant current charge drain circuits, generally aggravate errors created during clamping and errors caused by low frequency distortion.

It is, therefore, an object of this invention to clamp accurately an applied composite video signal to a selected reference level.

It is another object of this invention to minimize distortion in a clamped video signal previously subjected to low frequency distortion (tilt) errors.

It is yet another object of this invention to compensate continuously for distortion introduced on the video signal by the action of the clamping circuit.

SUMMARY OF THE INVENTION

These and other objects are accomplished in accordance with the invention by selectively draining charge from an energy storage element associated with a level restoring circuit. Continuous variation in the magnitude of the charge drained from the storage element is effected by varying the conduction of a device shunting the storage element. Charge drain magnitude is controlled to vary in an inverse relationship to a unidirectional voltage developed in the clamp circuit by an applied video signal. Thus, errors in the received signal are continuously corrected.

More specifically, a compensating circuit associated with a DC restoring stage, in accordance with the principles of this invention, includes an amplifier to which is applied the signal to be compensated. The amplifier develops a voltage indicative of the received video signal level. A controllable device, for example, a transistor, is used to drain charge from a capacitor associated with the DC restorer. The conduction of the transistor is continuously controlled by the voltage developed in the amplifier. Thus, by varying the conduction of the transistor in a selected relationship to the voltage developed in the amplifier stage, tilt and other errors are continuously compensated in the received video signal.

These and other objects and advantages of the invention will be more fully understood from the following detailed description of illustrative embodiments thereof taken in connection with the appended drawings.

DETAILED DESCRIPTION OF THE INVENTION

Low frequency distortion of a restored video signal has two under undesirable effects on a display developed by the signal, namely, shadowing and shading. These effects are illustrated by the signal shown in FIG. 1. A display developed by this signal is black at the left portion 10, white at left-center 11, a reduced white level at right-center 12 and a darker black at the right portion 13. The variation in the white level and the lower black level are caused both by low frequency distortion (tilt) of the received signal and by the clamping action. The tilt causes a display, developed by the video signal, to have an appearance that the white portion has cast a dark shadow horizontally to the right. Moreover, the tilt on the white level portion of the signal causes the scene developed by that portion of the video signal to become successively darker toward the right-hand portion of the scene. Thus, an undesirable false shadowing and shading is given to the display.

Figure 2:
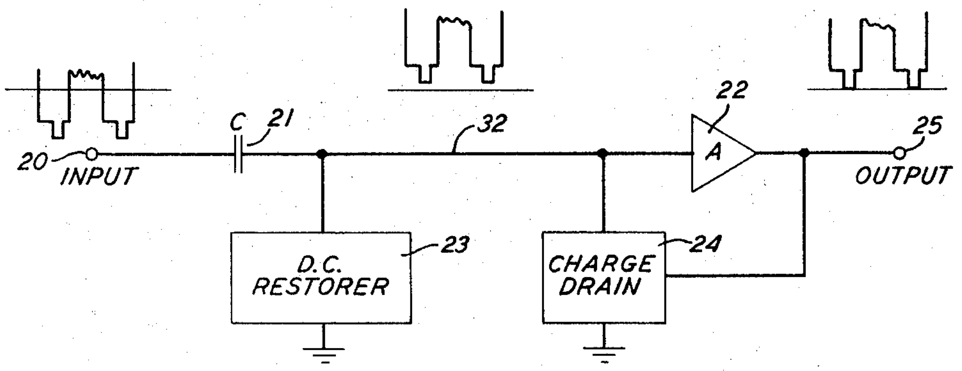
FIG. 2 is a schematic diagram in block form of a clamping circuit that illustrates the principles of the present invention.

FIG. 2 illustrates a circuit in block schematic form for clamping a composite video signal to a reference level and for compensating the signal for low frequency distortion errors. Thus, a video signal to be compensated is applied to amplifier 22 via terminal 20 and capacitor 21. A DC component is inserted in the video signal, in a manner well-known in the art by DC restorer 23. Wandering of the DC level is eliminated by draining charge from capacitor 21 via charge drain 24. Compensation for low frequency errors in the video signal is effected, in accordance with the invention, by selectively controlling charge drain 24. The magnitude of the charge drained from capacitor 21 is varied by proportionately feeding back to drain 24 a signal developed at output terminal 25 of amplifier 22. It is known that the tendency of a received video signal to tilt toward the average level of the signal increases with an increase in the instantaneous deviation of the signal from the average level. Thus, for a video signal having an instantaneous level which is white or near white, system tilt keeps the sync tips of the signal down, i.e., toward the reference level, thereby insuring subsequent clamping. In this instance, charge drain is undesirable. When the instantaneous level of the video signal is less than the average video level, the sync tips, and consequently the video signal, tend to drift away from the reference level, preventing sync tip clamping and causing undesirable effects. In this instance, charge drain is necessary.

Therefore, in order to compensate for these errors, namely, those caused by low frequency distortion and by the clamping action, the magnitude of charge drained from capacitor 21, and thus the potential developed across capacitor 21, is varied inversely as the signal developed at output 25. That is, as the signal developed at output 25 becomes more positive, the charge drained via drain 24 is decreased, thereby negating downward tilt in the video signal. On the other hand, as the instantaneous signal developed at output 25 approaches or becomes less than the average level, the magnitude of the charge drained from capacitor 21 increases, again compensating for errors in the video signal, and assuring subsequent clamping. Accordingly, the magnitude of charge drained from capacitor 21 is controlled to vary inversely with respect to the average magnitude of the restored composite video signal appearing at output point 25.

Figure 3:
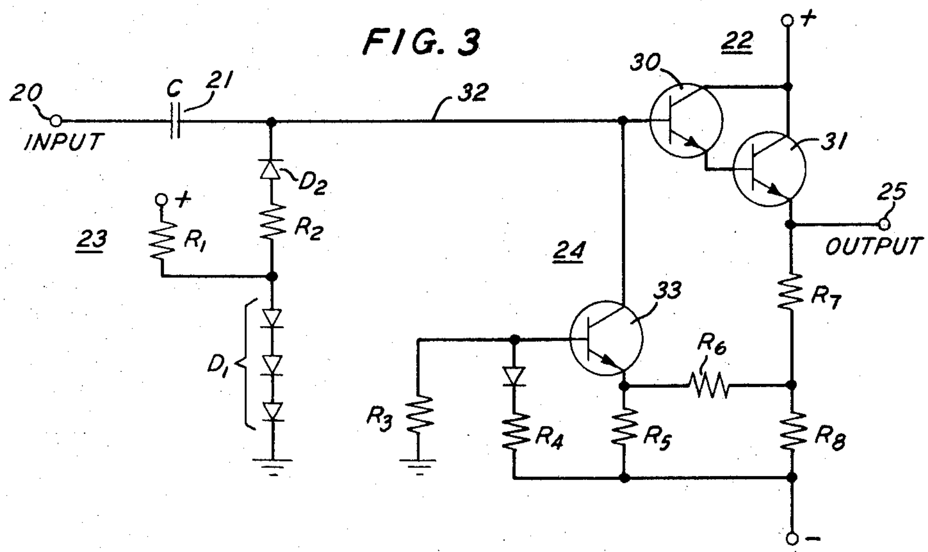
FIG. 3 shows in greater detail a circuit for practicing the principles of the invention.

FIG. 3 shows in greater detail a circuit which may be utilized in practicing the principles of the present invention. As stated above, a composite video signal is applied to amplifier 22 via terminal 20 and capacitor 21. Amplifier 22 may be of any desired form having sufficiently high input impedance to minimize loading on capacitor 21. Preferably, the amplifier is a Darlington configuration of transistors 30 and 31 arranged as an emitter-follower. A DC component for insertion into the received video signal is established by restorer 23. Restorer 23 may be of any desired form, for example, it may comprise a source of positive potential applied via resistor $R_l$ to diodes $D_l$ establishing a desired reference level. The reference level, in this example approximately 1.4 volts, is applied via resistor $R_2$ and diode $D_2$ to signal path 32. A series connection of three individual diodes are utilized to form $D_1$ diode in this instance to compensate for voltage drops and temperature variations in diode $D_2$ and in the base-emitter junctions of transistors 30 and 31. Of course, any other desired restorer configuration may be utilized. Resistor $R_2$ of restorer 23 increases the time constant of the circuit, which tends to reduce the possibility of clamping on narrow noise spikes, rather than the broader sync tips of the composite video signal. The operation of restorer 23 in conjunction with capacitor 21 is well-known in the art. A similar DC restorer circuit is described in detail in U.S. Pat. No. 2,598,929 issued to R. C. Moore on Jun. 3, 1952.

Wandering in the DC level established on signal path 32 is controlled by draining a portion of the charge developed on capacitor 21 via charge drain 24. Charge drain 24 may be any of a number of controllable devices, for example, transistor 33. Transistor 33 is biased, in well-known fashion, to operate at a predetermined optimum collector current level in the absence of an applied signal. Thereafter, the collector current level of transistor 33 is controlled in accordance with the invention by proportionately feeding back, via resistor $R_6$, a signal developed at output 25, which is representative of the magnitude of the applied video signal.

Figure 1:
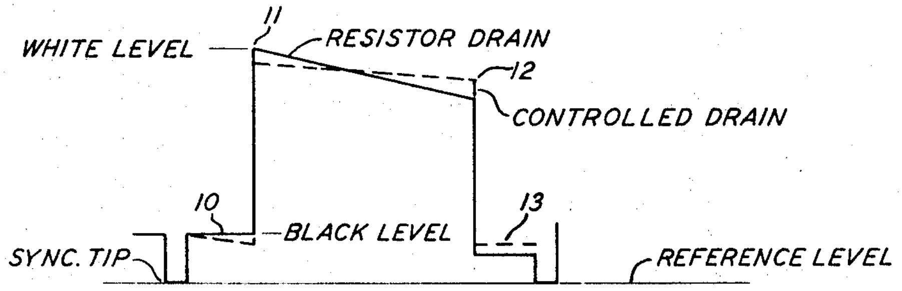
FIG. 1 graphically depicts a distorted composite video signal after clamping.

As is known in the art, the collector current of transistor 33 varies in proportion to the potential applied to the emitter terminal. Thus, for an NPN device as the emitter potential becomes more positive, the collector current decreases and vice versa. Initially, the potential level at output 25, in the absence of an applied signal, is adjusted to be zero. The initial potential level at output 25 as well as the degree in variation of collector current of transistor 33 is established by selectively choosing the resistive values of resistors $R_3$ through $R_8$. Representative values for the components and potentials of FIG. 3, not to be construed as to limit the scope of the invention, are:

$R_1$ – 3.9 kilohms
$R_2$ – 200 ohms
$R_3$ – 7.5 kilohms
$R_4$ – 620 ohms
$R_5$ – 12 kilohms
$R_6$ – α20 kilohms
$R_7$ – 5,1 kilohms
$R_8$ – 680 ohms
C – .025 microfarads
v+ – 17 volts
V– – –17 volts In operation, the circuit of FIG. 3 compensates for low frequency distortion errors (tilt) in a received video signal. For example, a composite video signal, as illustrated in FIG. 1, is selectively adjusted to minimize undesired shadowing and shading effects. Errors in such a signal, when applied to a conventional circuit having a typical resistor charge drain, are aggravated, i.e., tilt is increased, as illustrated by the solid lines of FIG. 1. In the present invention, tilt errors are continuously compensated, resulting in a signal as indicated by the dashed lines of FIG. 1. This is accomplished in the circuit of FIG. 3 as follows: the signal at 10 (FIG. 1) is at a low level (black), therefore the output at 25 is reduced from some initial level. The reduced signal proportionately appears, via $R_6$, at the emitter terminal of transistor 33 causing the collector current level to increase, thereby draining charge from capacitor 21. Thus, the signal at 10 is pulled downward and becomes darker, as indicated by the dashed lines (FIG. 1). When the applied signal is at the white level, the voltage developed at output 25 is increased and again the increased signal proportionately appears at the emitter of transistor 33, causing transistor 33 to conduct at a lower collector current level. The reduced current allows charge to build up on capacitor 21, thereby reducing tilt on the white level portion of the signal, as indicated by the dashed lines (FIG. 1). This also results in raising black level 13 at the right side of the signal. Thus, in the compensated signal, the black levels are equalized and the white level is maintained nearly at a constant level, resulting in a considerable reduction of the undesired shadowing and shading effects.

The above described arrangements are, of course, merely illustrative of the application of the principles of this invention. Numerous other arrangements may be devised by those skilled in the art without departing from the spirit and scope of the invention.

I claim:

1. Compensating circuit means which comprises:

means for restoring a direct current potential component to a composite video signal, said restoring means including capacitor means for developing said potential by establishing a charge thereon;

controllable means responsive to a potential representative of said restored composite video signal developed in said circuit for selectively draining charge from said capacitor means thereby to compensate for distortion errors in said video signal; and means for controlling said charge drain means so that the magnitude of charge drained from said capacitor means varies inversely with respect to the magnitude of said restored video signal.

2. A circuit for compensating a composite video signal for distortion errors which comprises:

means for restoring a direct current potential component to a composite video signal, said restoring means including capacitor means for developing said potential by establishing a charge thereon;

an amplifier to which said restored signal is applied, said amplifier having input and output terminals;

controllable means responsive to a potential representative of said restored composite video signal developed at the output of said amplifier for selectively draining charge from said capacitor means thereby to compensate for said distortion errors; and means for supplying said output potential to said controllable means so that the magnitude of charge drained from said capacitor means is controlled to vary inversely with respect to the average magnitude of said output potential.

3. The circuit as defined in claim 2, wherein said controllable means includes a transistor having collector, emitter and base terminals, said transistor being connected in circuit relationship shunting said capacitor means to drain charge therefrom, and wherein said supplying means includes feedback means for proportionately applying the signal developed at said output terminal to the emitter terminal for said transistor, thereby to control the magnitude of charge drained from said capacitor means.

4. A circuit as defined in claim 3, wherein said amplifier is a noninverting amplifier, and wherein said controllable transistor means is responsive to said feedback signal and arranged in circuit configuration to vary in collector current conduction level in an inverse relationship to the magnitude of said feedback signal.